US008274913B2

(12) United States Patent
Ralston

(10) Patent No.: US 8,274,913 B2
(45) Date of Patent: Sep. 25, 2012

(54) METHOD AND SYSTEM FOR CONFIGURING WIRELESS COMMUNICATION OF SURVEY SENSORS AND CONTROLLERS

(75) Inventor: Stuart Edward Ralston, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 1083 days.

(21) Appl. No.: 12/188,529

(22) Filed: Aug. 8, 2008

(65) Prior Publication Data

US 2010/0034125 A1 Feb. 11, 2010

(51) Int. Cl.
H04L 12/28 (2006.01)
(52) U.S. Cl. ........................................ 370/254; 370/255
(58) Field of Classification Search .................. 370/328, 370/329, 338, 339, 254, 255
See application file for complete search history.

(56) References Cited

U.S. PATENT DOCUMENTS

| 6,366,782 | B1* | 4/2002 | Fumarolo et al. ............. 455/457 |
| 8,089,953 | B2* | 1/2012 | Angelot et al. ............... 370/351 |
| 2007/0199066 | A1* | 8/2007 | Smith et al. ..................... 726/15 |
| 2007/0218911 | A1* | 9/2007 | Islam et al. ..................... 455/445 |
| 2007/0250605 | A1* | 10/2007 | Duchene et al. .............. 709/220 |
| 2008/0176514 | A1* | 7/2008 | Nadas .......................... 455/41.2 |
| 2008/0207129 | A1* | 8/2008 | Page et al. ..................... 455/41.3 |
| 2009/0103547 | A1* | 4/2009 | Lam et al. ................ 370/395.53 |
| 2009/0201830 | A1* | 8/2009 | Angelot et al. ............... 370/254 |
| 2011/0034179 | A1* | 2/2011 | David et al. ................ 455/456.1 |

* cited by examiner

Primary Examiner — Chuong T Ho

(57) ABSTRACT

A method and system for configuring wireless communication of survey sensors and controllers is recited. In one embodiment, a survey device controller is configured to receive a first wireless communication comprising a sequence indicating that a survey device is configured to participate in an automatic configuration process with the survey device controller. The system further comprises the survey device which is configured to generate a second wireless communication indicating the reception of a selection event to communicatively couple the survey device with the survey device controller. The survey device controller is further configured to automatically initiate a wireless communication connection comprising the survey device controller and the survey device in response to receiving the second wireless signal contemporaneous with receiving a signal which is generated by the survey device controller to communicatively couple the survey device controller with the survey device.

38 Claims, 10 Drawing Sheets

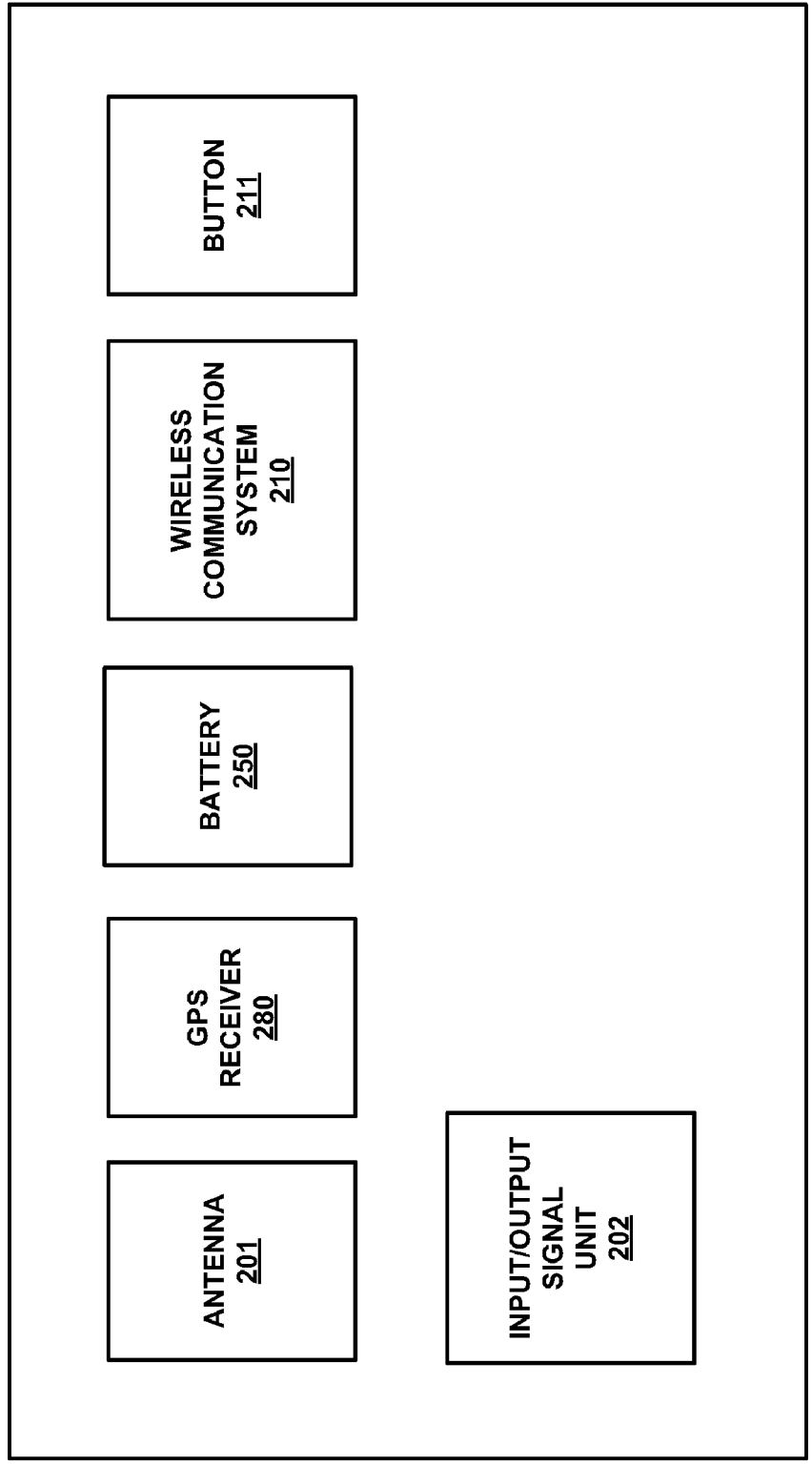

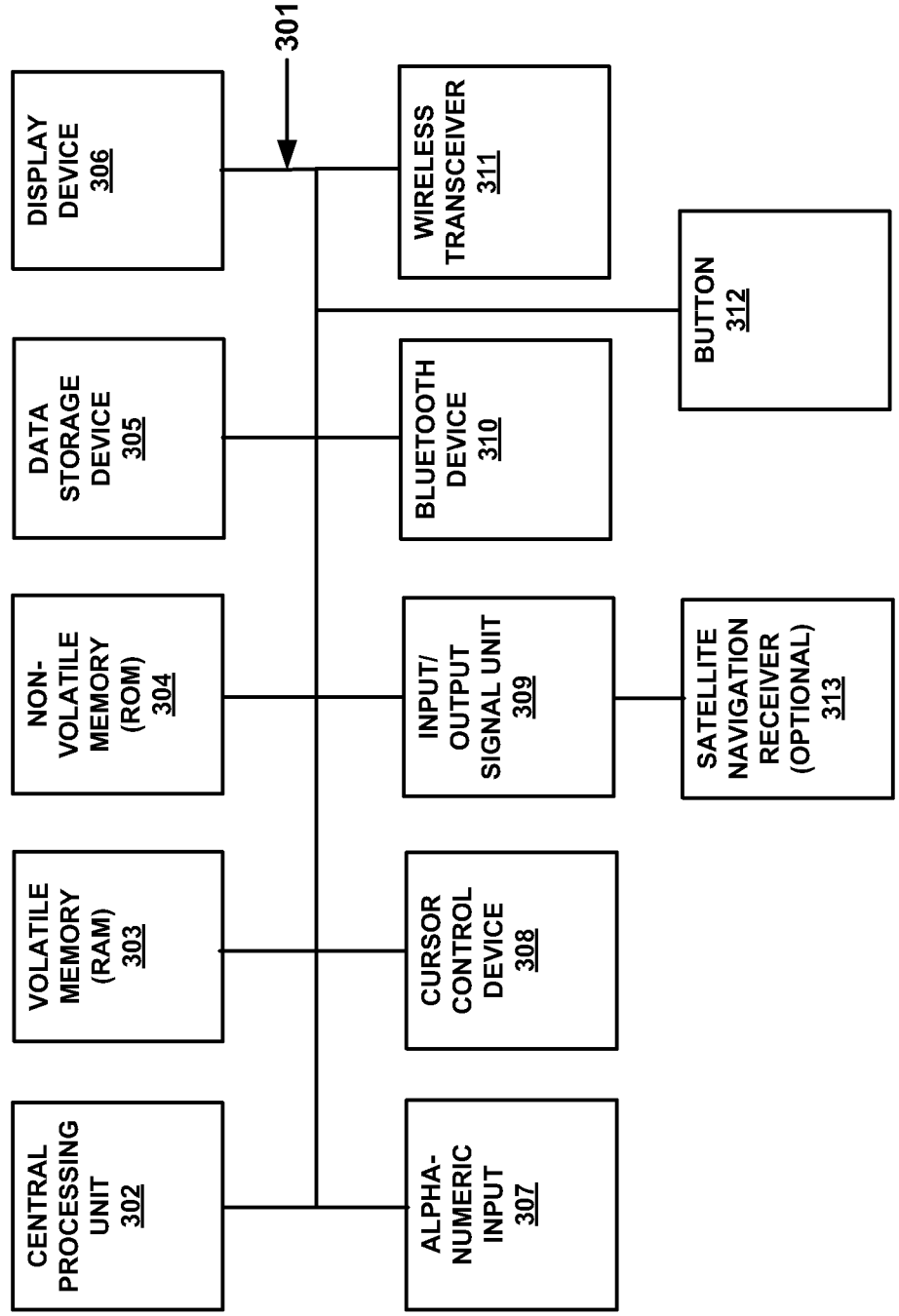

METHOD AND SYSTEM FOR CONFIGURING WIRELESS COMMUNICATION OF SURVEY SENSORS AND CONTROLLERS

FIELD OF THE INVENTION

Embodiments are related to geographic position determining systems.

BACKGROUND

Geographic data collection systems have used cables to communicatively couple survey devices with controllers. One example is a satellite navigation signal receiver which is often mounted on top of a pole. The controller for the pole mounted receiver was often mounted at a second position on the pole which was easier for an operator to access in order to view displayed information and to input data and/or commands.

More recently, wireless communication links have been used to communicatively couple the pole mounted receiver with the controller. The use of wireless communication links has been advantageous in that the cable connectors are expensive and can be damaged, thus rendering the receiver/controller system unusable. This is especially problematic when damage occurs away from the office due to the remote locations at which surveying is frequently performed and the resulting amount of time it takes to replace the cabling.

Often, Bluetooth® communication devices are used to communicatively couple the receiver with the controller. Bluetooth® is a standard and communications protocol for creating ad-hoc short range wireless networks, also known as personal area networks (PANs). Bluetooth® uses a frequency-hopping spread spectrum short-range radio frequency communication system to facilitate low bandwidth communications between devices. Thus, devices can be out of line of sight and still communicate as long as they are within range of each other. Typically, Bluetooth® devices initiate a discovery process in which they wirelessly detect other Bluetooth® devices in the vicinity. The other Bluetooth® devices send information such as a device name. A list of the Bluetooth® devices is then displayed and a user can select one or more devices to pair with to create a network.

One drawback of this system is that, when attempting to create or configure a wireless link between surveying devices and controllers, other Bluetooth® devices in the vicinity may hinder the process. For example, a surveyor may attempt to configure the wireless link between a surveying device and a controller in the office prior to taking the equipment to the field. Thus, if a piece of equipment is defective it can be replaced without the necessity of returning to the office. However, when initiating the Bluetooth® connection process, other Bluetooth® devices in the vicinity such as cellular telephones and/or personal digital assistants (PDAs) may also respond during the Bluetooth® discovery process. Additionally, other Bluetooth® equipped surveying devices in the vicinity (e.g., other controllers, receivers, etc.) will also respond during the Bluetooth® discovery process. Thus, when attempting to create a communication link between a controller and a receiver, it may be more difficult for a user to correctly determine which is the correct receiver with which to communicatively couple. Alternatively, the user may communicatively couple with the wrong receiver. Thus, when the user takes the equipment to the survey site and uses the controller to communicate with the receiver, it is discovered that the controller cannot communicate with the receiver. An additional disadvantage is that a number of screens are navigated in order to create and configure the wireless connection between devices. Many users find navigation of the screens to be difficult and/or counter intuitive which complicates the process.

SUMMARY

A method and system for configuring wireless communication of survey sensors and controllers is recited. In one embodiment, a survey device controller is configured to receive a first wireless communication comprising a sequence indicating that a survey device is configured to participate in an automatic configuration process with the survey device controller. The system further comprises the survey device which is configured to generate a second wireless communication indicating the reception of a selection event to communicatively couple the survey device with the survey device controller. The survey device controller is further configured to automatically initiate a wireless communication connection comprising the survey device controller and the survey device in response to receiving the second wireless signal contemporaneous with receiving a signal which is generated by the survey device controller to communicatively couple the survey device controller with the survey device.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

FIG. 2A is a block diagram of a survey receiver in accordance with one embodiment.

FIG. 3 is a block diagram of a survey device controller in accordance with one embodiment.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "receiving," "initiating," "using," "generating," "ignoring," "suspending," "monitoring," "broadcasting," "selecting," "establishing," "terminating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
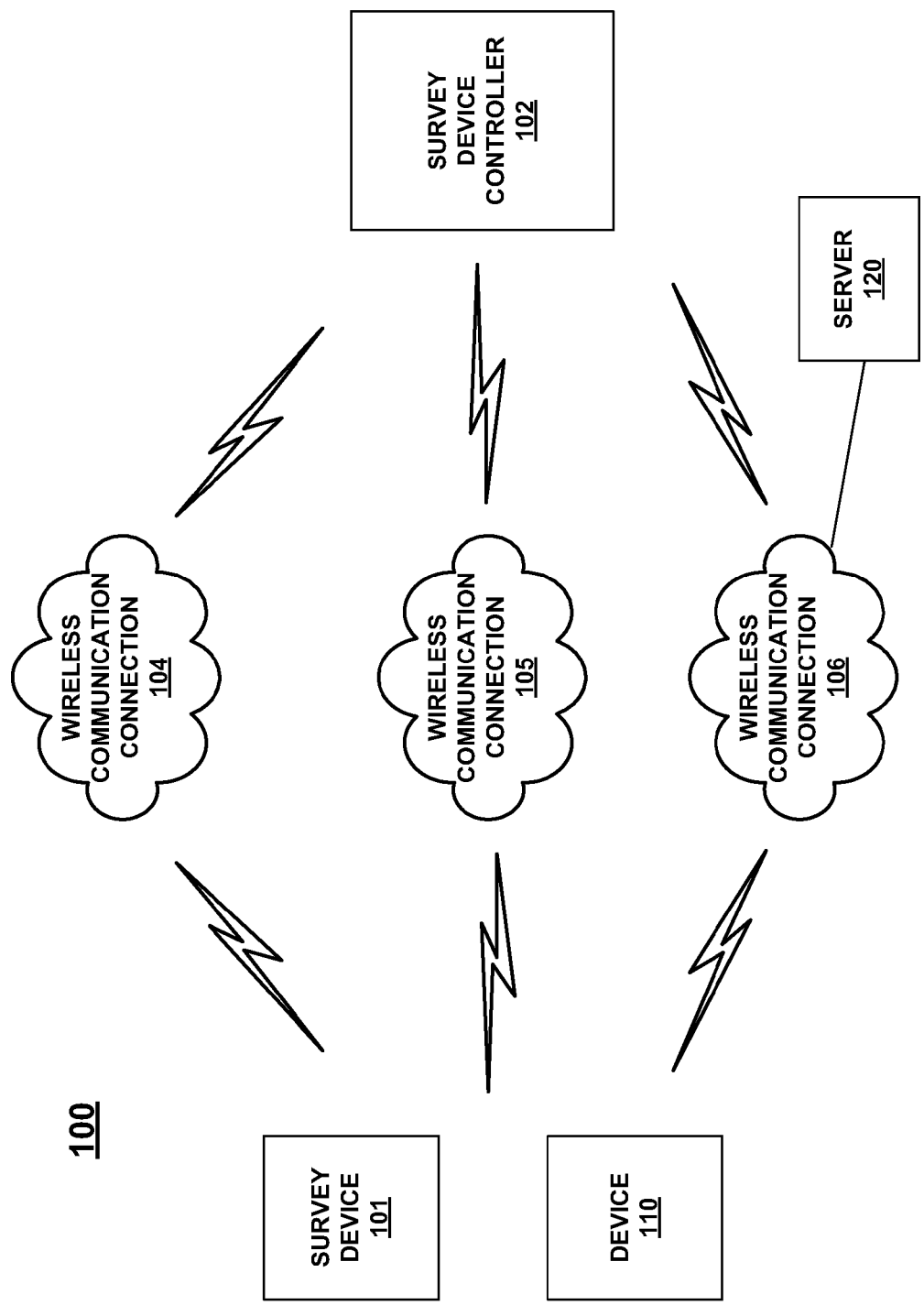
FIG. 1 is a block diagram of a system for configuring wireless communication of a survey device and a survey device controller in accordance with one embodiment.

FIG. 1 is a block diagram of a system 100 for configuring wireless communication of a survey device and a survey device controller in accordance with one embodiment. In one embodiment, system 100 comprises a survey device 101 and a survey device controller 102. In one embodiment, system 100 further comprises a wireless communication connection 104 which communicatively couples survey device 101 with survey device controller 102. In other embodiments, system 100 further utilizes wireless communication connection 105 and/or wireless communication connection 106, or a combination thereof, which can also be used to communicatively couple survey device 101 and survey device controller 102.

In one embodiment, survey device 101 comprises a pole-mounted satellite navigation receiver, also referred to as a "rover." As will be described in greater detail below, one embodiment of a pole-mounted satellite navigation receiver receives signals from one or more orbiting satellites and derives information descriptive of the geographic position of survey device 101. In this instance, survey device controller 102 comprises a portable electronic device which is used to control operations of survey device 101 via a wireless communication connection (e.g., 104). One embodiment of the invention uses a Global Navigation Satellite System (GNSS) receiver (e.g., GPS receiver 280 of FIG. 2A) to derive a geographic position of survey device 101. GNSS refers to a number of satellite navigation systems that provide global geo-spatial positioning data which permits electronic devices to determine their geographic position (e.g., latitude, longitude, and altitude) with great precision. Satellite systems included in the GNSS include, but are not limited to: the Global Positioning System (GPS), GLONASS, Beidou, and IRNSS navigation systems which are, or are soon to be, implemented. However, mobile electronic device 110 is not limited to using a GNSS position determining system alone.

For example, survey device 101 may utilize cellular telephone signals, digital television signals, terrestrial-based navigation systems, inertial navigation systems, etc. to determine its position In one embodiment, survey device 101 comprises a survey reference station which is configured to measure an azimuth, elevation, and distance to an object such a rover. In this instance, survey device controller 102 comprises a portable electronic device which is used to control the operation of survey device 101 via a wireless communication connection (e.g., 104, 105, 106, or a combination thereof).

It is noted that embodiments are not limited to communicatively coupling survey devices and survey device controllers alone. Instead, the above description is intended to illustrate devices which may be communicatively coupled in accordance with one embodiment. In one embodiment, a plurality of devices (e.g., 110) can be communicatively coupled with survey device controller 102 via communication connection 104, communication connection 105, communication connection 106, or a combination thereof. Other devices which may be communicatively coupled in accordance with one embodiment include, but not limited to, a camera, a laser tracking device, an optical total station, a robotic total station, a Geographic Information System (GIS) device such as a GIS sensor, a device controller or other devices which utilize wireless communications.

In one embodiment, a server 120 is coupled with wireless communication connection 106. As will be discussed in greater detail below with reference to FIG. 5C, server 120 is configured to facilitate establishing communications between survey device 101 and survey device controller 102. In one embodiment, server 120 can be operated by the network which implements wireless communication connection 106. In another embodiment, server 120 is operated as a service by a third party provider.

Figure 2B:
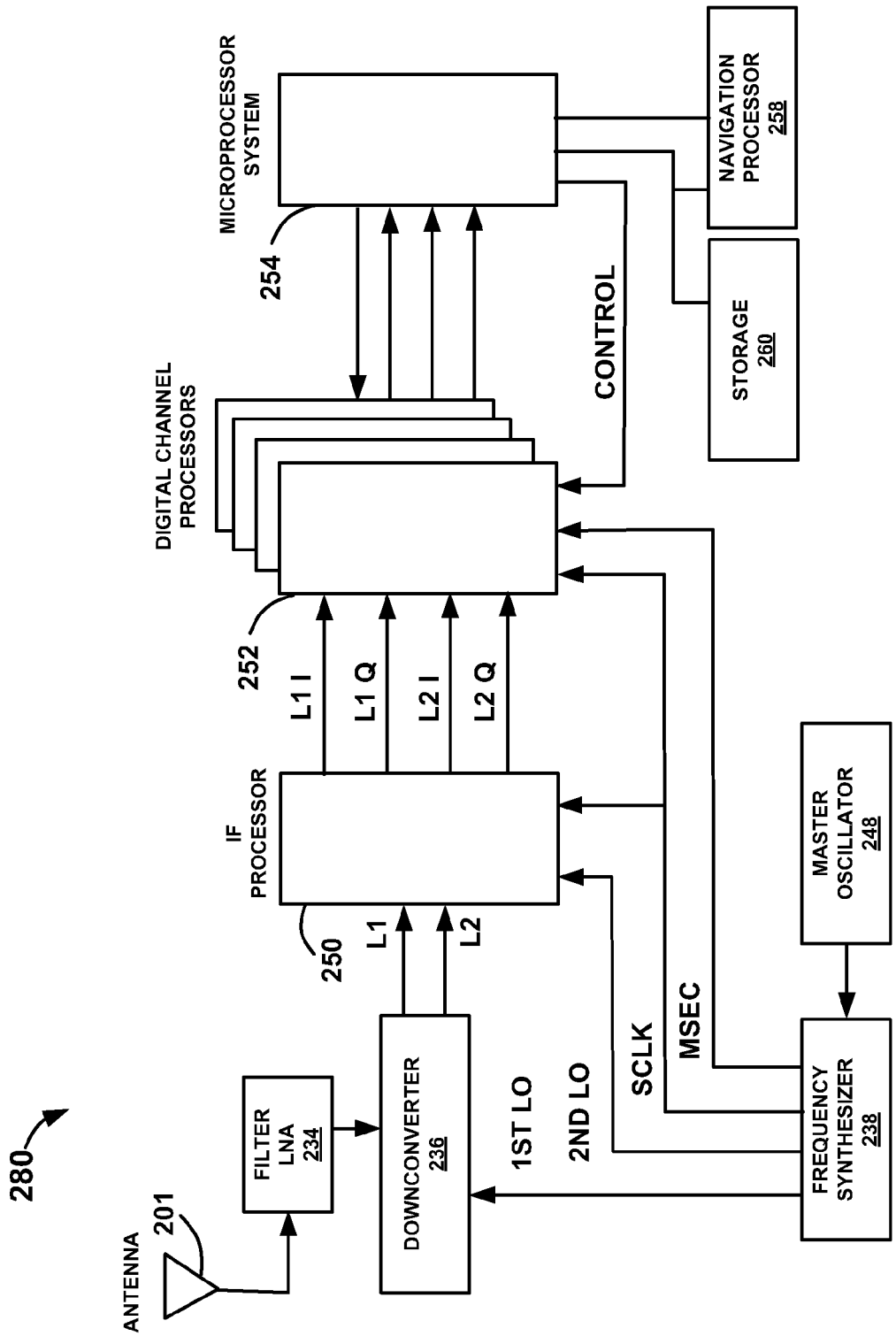
FIG. 2B is a block diagram of a GNSS receiver in accordance with one embodiment.

FIG. 2A is a block diagram of a survey device 200 in accordance with one embodiment. In the embodiment of FIG. 2A survey receiver 200 comprises a rover unit which is described above with reference to survey device 101 of FIG. 1. In FIG. 2A, survey device 200 comprises an antenna 201 for receiving signals from orbiting navigation satellites. Survey device 200 further comprises a GPS receiver 280 for receiving satellite navigation signals and deriving a geographic position and which is described in greater detail below with reference to FIG. 2B. It is noted that while a GPS receiver 280 is described, embodiments are well suited to using any of the GNSS navigation systems described above with reference to FIG. 1. Survey device 200 further comprises a battery 250 for providing power to survey device 200. Survey device 200 further comprises a wireless communication system 210 for implementing wireless communication with another device such as survey device controller 102 of FIG. 1. In one embodiment, wireless communication system 210 is a Bluetooth® communication system. In another embodiment, wireless communication system 210 is a radio transceiver. In one embodiment, wireless communication system 210 is compliant with the IEEE 802.11 standard for wireless local area networks including, but not limited to, a WiFi wireless network. In one embodiment, wireless communication system 210 is a cellular communication system. It is noted that another communication system such as a laser or infrared based communication system can be used. Additionally, a combination of the above discussed communication systems, or other wireless communication systems, may be implemented by survey device 200. In one embodiment, wireless communication system 210 is used to communicatively couple survey device 200 with a survey device controller (e.g., 102 of FIG. 1). In one embodiment, survey device 200 further comprises a button 211 which is used to implement configuring wireless communication in accordance with one embodiment.

In one embodiment, survey device 200 comprises an input/output (I/O) signal unit (e.g., interface) 202 for interfacing with a peripheral device, computer system, computer network, modem, mass storage device, etc.). In one embodiment, input/output signal unit 202 may comprise a USB data port, a RS232 serial data port, or the like for transferring data via a wired data connection. In one embodiment, input/output signal unit 202 can be used to communicatively couple survey device 200 with additional components, controllers (e.g., survey device controller 300 of FIG. 3), or other computer systems.

Example GNSS Receiver

With reference now to FIG. 2B, a block diagram is shown of an embodiment of an example GNSS receiver which may be used in accordance with various embodiments described herein. In particular, FIG. 2B illustrates a block diagram of a GNSS receiver in the form of a general purpose GPS receiver 280 capable of demodulation of the L1 and/or L2 signal(s) received from one or more GPS satellites. It is noted that the components described below with reference to FIG. 2B may be performed by satellite navigation signal reception component 280 described above with reference to FIG. 2A. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Embodiments may be utilized by GNSS receivers which access the L1 signals alone, or in combination with the L2 signal(s). A more detailed discussion of the function of a receiver such as GPS receiver 280 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 280 of FIG. 2B.

In FIG. 2B, received L1 and L2 signal is generated by at least one GPS satellite. Each GPS satellite generates different signal L1 and L2 signals and they are processed by different digital channel processors 252 which operate in the same way as one another. FIG. 2B shows GPS signals (L1=1575.42 MHz, L2=1227.60 MHz) entering GPS receiver 280 through a dual frequency antenna 201. Master oscillator 248 provides the reference oscillator which drives all other clocks in the system. Frequency synthesizer 238 takes the output of master oscillator 248 and generates important clock and local oscillator frequencies used throughout the system. For example, in one embodiment frequency synthesizer 238 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 234 performs filtering and low noise amplification of both L1 and L2 signals. The noise figure of GPS receiver 280 is dictated by the performance of the filter/LNA combination. The downconverter 236 mixes both L1 and L2 signals in frequency down to approximately 175 MHz and outputs the analog L1 and L2 signals into an IF (intermediate frequency) processor 250. IF processor 250 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 252 inputs the digitally sampled L1 and L2 in-phase and quadrature signals. All digital channel processors 252 are typically are identical by design and typically operate on identical input samples. Each digital channel processor 252 is designed to digitally track the L1 and L2 signals produced by one satellite by tracking code and carrier signals and to form code and carrier phase measurements in conjunction with the microprocessor system 254. One digital channel processor 252 is capable of tracking one satellite in both L1 and L2 channels. Microprocessor system 254 is a general purpose computing device which facilitates tracking and measurements processes, providing pseudorange and carrier phase measurements for a navigation processor 258. In one embodiment, microprocessor system 254 provides signals to control the operation of one or more digital channel processors 252. Navigation processor 258 performs the higher level function of combining measurements in such a way as to produce position, velocity and time information for the differential and surveying functions. Storage 260 is coupled with navigation processor 258 and microprocessor system 254. It is appreciated that storage 260 may comprise a volatile or non-volatile storage such as a RAM or ROM, or some other computer readable memory device or media.

FIG. 3 is a block diagram of a survey device controller 300 in accordance with one embodiment. In the embodiment of FIG. 3 survey device controller 300 comprises a wireless controller which is described above with reference to survey device controller 102 of FIG. 1. In the embodiment of FIG. 3, survey device controller 300 comprises an address/data bus 301 for conveying digital information between the various components, a central processor unit (CPU) 302 for processing the digital information and instructions, a volatile main memory 303 comprised of volatile random access memory (RAM) for storing the digital information and instructions, and a non-volatile read only memory (ROM) 304 for storing information and instructions of a more permanent nature. In addition, survey device controller 300 may also include a data storage device 305 (e.g., a magnetic, optical, floppy, or tape drive or the like) for storing vast amounts of data. In one embodiment, data storage device 305 comprises a removable data storage device such as a Universal Serial Bus (USB) memory device, a Secure Digital memory device, a CompactFlash memory device, etc.). It should be noted that the software program for performing the configuration of wireless communication can be stored either in volatile memory 303, non-volatile memory device 304, or data storage device 305.

Other devices comprising survey device controller 300 include a display device 306 for displaying information to a computer user, an alpha-numeric input device 307 (e.g., a keyboard), and a cursor control device 308 (e.g., mouse, trackball, light pen, etc.) for inputting data, selections, updates, etc. Survey device controller 300 can also include a mechanism for emitting an audible signal (not shown).

Returning still to FIG. 3, display device 306 of FIG. 3 may be a liquid crystal device, cathode ray tube, or other display device suitable for creating graphic images and alpha-numeric characters recognizable to a user. In one embodiment, display device 306 may comprise a touchscreen assembly. Cursor control device 308 allows the computer user to dynamically signal the two dimensional movement of a visible symbol (cursor) on a display screen of display device 306. Many implementations of cursor control device 308 are known in the art including a trackball, mouse, touch pad, joystick, or special keys on alpha-numeric input 307 capable of signaling movement of a given direction or manner displacement. Alternatively, it will be appreciated that a cursor can be directed and/or activated via input from alpha-numeric input 307 using special keys and key sequence commands. Alternatively, the cursor may be directed and/or activated via input from a number of specially adapted cursor directing devices.

Furthermore, survey device controller 300 comprises an input/output (I/O) signal unit (e.g., interface) 309 for interfacing with a peripheral device, computer system, computer network, modem, mass storage device, etc.). In one embodiment, input/output signal unit 309 may comprise a USB data port, a RS232 serial data port, or the like for transferring data via a wired data connection. In one embodiment, input/output signal unit 309 can be used to communicatively couple survey device controller 300 with components including, but not limited to, memory devices, satellite navigation receivers (e.g., 313 of FIG. 3), scanners, cameras, communication devices, etc. It is noted that survey device controller 300 can comprise a plurality of input/output signal units to communicatively couple with a variety of devices.

Survey device controller 300 further comprises a Bluetooth® device 310 for communicating via a Bluetooth® communication connection and a wireless transceiver 311 for communicating via a wireless communication connection. In one embodiment, a plurality of wireless transceivers 311 may be utilized to communicate using a plurality of wireless communication standards. For example, a first wireless transceiver 311 may a cellular telephone transceiver while a second wireless transceiver 311 may be compliant with, for example, the IEEE 802.11 specifications for wireless networks, and a third wireless transceiver 440 may be comprise a 2.4 GHz frequency hopping radio transceiver. It is noted that in one embodiment survey device controller 300 can be configured with another communication system such as a laser or infrared based communication system. It is further noted that the wireless communication systems discussed above are not intended to limit embodiments of survey device controller 300 to these systems alone. In one embodiment, the operation of survey device 200 described above is controlled by survey device controller 300 via a wireless communication network. In one embodiment, survey device controller 300 also comprises a button 312 for configuring wireless communication in accordance with one embodiment.

Figure 4:
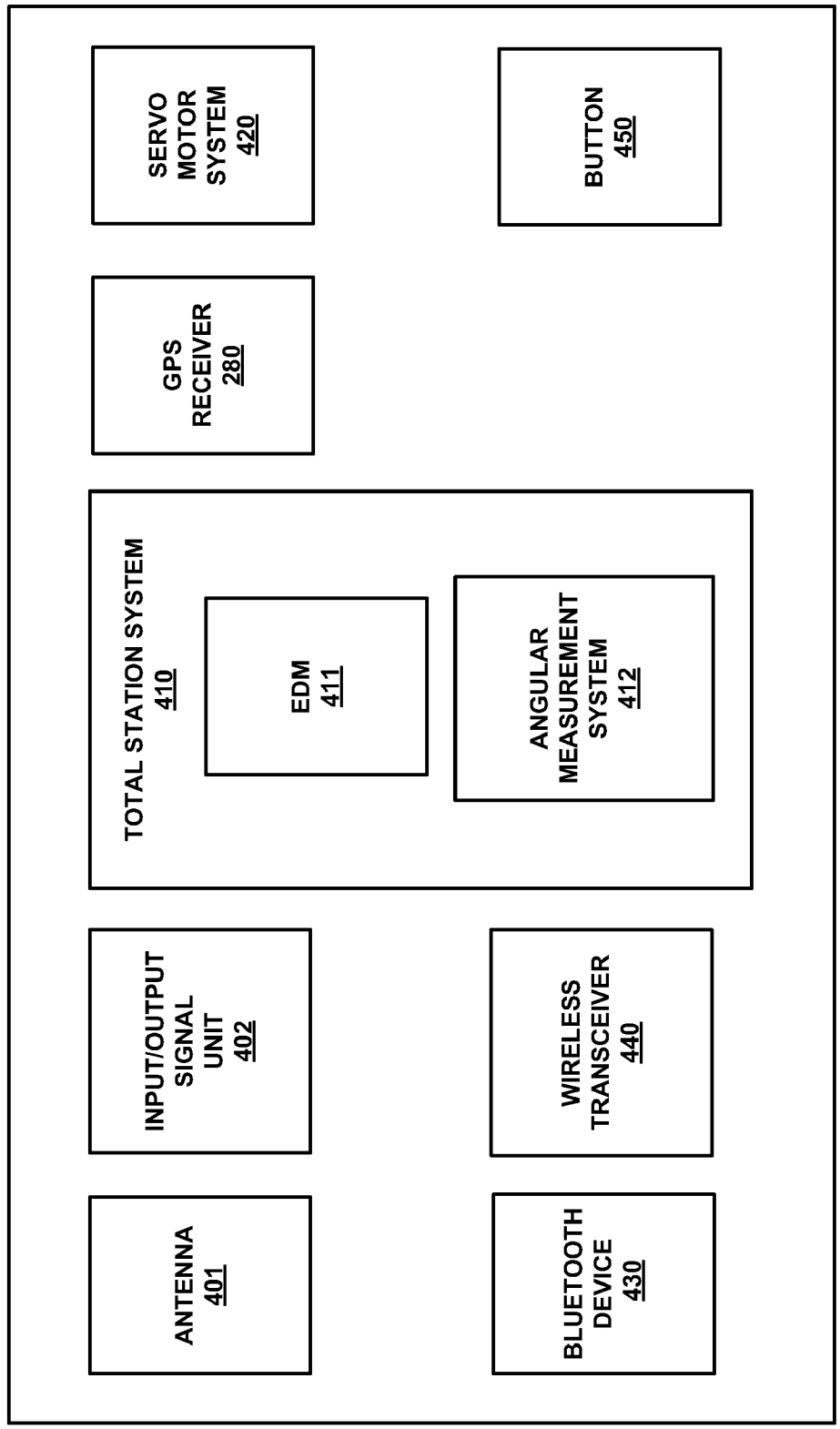
FIG. 4 is a block diagram of another survey device in accordance with one embodiment.

FIG. 4 is a block diagram of another survey device 400 in accordance with one embodiment. In the embodiment of FIG. 4, survey device 400 comprises a survey reference station, or total station. In one embodiment, survey device 400 comprises antenna 401 and a GPS receiver 280 which are described in greater detail above with reference to FIG. 2B. Survey device 400 further comprises a total station system 410 comprising an electronic distance measuring (EDM) device 411 and a angular measurement system 412 for determining horizontal and/or vertical and/or angular displacement information and/or azimuth displacement information to an object (e.g., a rover unit as described above with reference to FIG. 2A) relative to survey device 400. Survey device 400 further comprises a servo-motor system 420 for controlling the orientation of EDM device 411 in response to a signal from a controller. Survey device 400 further comprises a Bluetooth® device 430 for communicating via a Bluetooth® wireless connection and a wireless transceiver 440 for communicating via another wireless connection. In one embodiment, a plurality of wireless transceivers 440 may be utilized to communicate using a plurality of wireless communication standards. For example, a first wireless transceiver 440 may a cellular telephone transceiver while a second wireless transceiver 440 may be compliant with, for example, the IEEE 802.11 specifications for wireless networks, and a third wireless transceiver 440 may be comprise a 2.4 GHz frequency-hopping spread-spectrum radio transceiver. It is noted that in one embodiment survey device 400 can be configured with another communication system such as a laser or infrared based communication system. Again, it is noted that discussion of wireless communication systems with reference to FIG. 4 is not meant to limit embodiments of survey device 400 to these systems alone. In one embodiment, survey device 400 is controlled by a survey device controller (e.g., 300 as described above with reference to FIG. 3) via a wireless communication connection. In one embodiment, survey device 400 further comprises a button 450 which is used to implement configuring wireless communication.

In one embodiment, survey device 400 comprises an input/output (I/O) signal unit (e.g., interface) 402 for interfacing with a peripheral device, computer system, computer network, modem, mass storage device, etc.). In one embodiment, input/output signal unit 402 may comprise a USB data port, a RS232 serial data port, or the like for transferring data via a wired data connection. In one embodiment, input/output signal unit 402 can be used to communicatively couple survey device 400 with additional components, controllers (e.g., survey device controller 300 of FIG. 3), or other computer systems.

Method for Configuring Wireless Communication

Figure 5A:
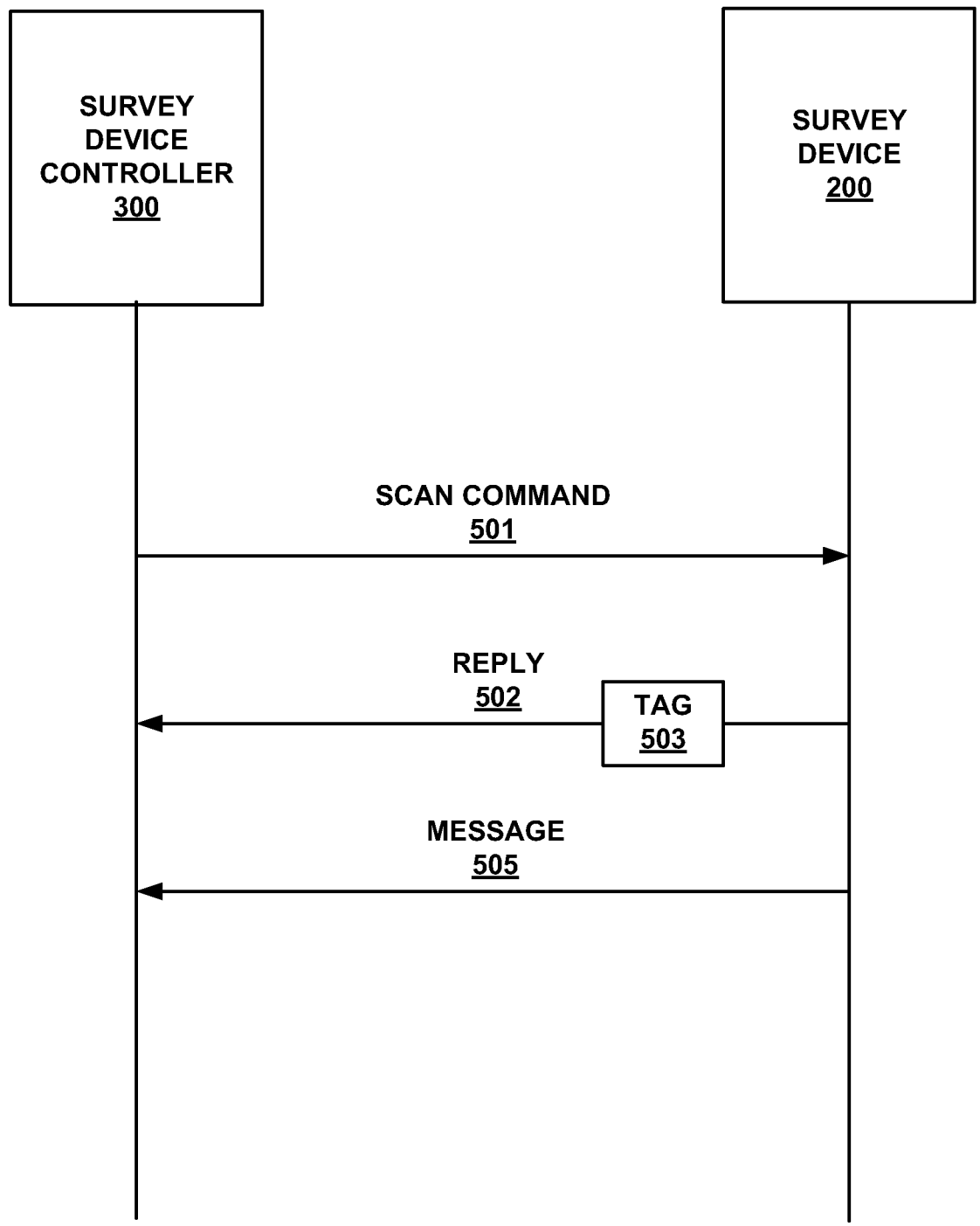
FIGS. 5A, 5B, and 5C show respective sequences of messages exchanged between a survey device controller and a survey device in accordance with one embodiment.

In the following discussion, FIG. 5A shows a sequence of messages exchanged in accordance with one embodiment. While the following discussion describes a sequence of communications between survey device 200 and survey device controller 300, it is noted that the sequence of communications may also be exchanged between survey device 400 (e.g., a survey reference station or robotic total station) and survey device controller 300. In one embodiment, survey device controller 300 is used to initiate and configure wireless communication with a survey device such as a rover unit (e.g., survey device 200 of FIG. 2A), or a reference station or total station (e.g., survey device 400 of FIG. 4. The following discussion will describe the configuration of wireless communication between a rover unit and a controller in greater detail.

In one embodiment, a user of controller 300 presses button 312 to initiate configuring wireless communication with survey device 200. In one embodiment, button 312 is disposed on controller 300 and it used exclusively for configuration of wireless communications. In one embodiment, the size, shape, color, and/or placement of button 312 distinguishes it from other buttons which may disposed on controller 300. In another embodiment, button 312 may be implemented as a region displayed on display device 306 which can be selected by the user to implement a "soft key" functionality. Again, the displayed button 312 is used exclusively for configuration of wireless communications. Thus, an indication that button 312 has been depressed is acted upon by processor 302 as a command to communicatively couple survey device controller 300 with a survey device (e.g., 200).

In response to an indication of the selection of button 312, survey device controller 300 initiates a scan command to discover other devices in the vicinity with which survey device controller 300 can establish wireless communications. In one embodiment, survey device controller 300 initiates a Bluetooth® discovery process using scan command 501. The Bluetooth® discovery process is well known in the art and is used to establish short range communication networks between devices. In one embodiment, in response to scan command 501 from survey device controller 300, survey device 200 generates a reply 502 which is sent to survey device controller 300. In one embodiment, the reply 502 sent to survey device controller 300 from survey device 200 comprises a sequence, or string of characters, (e.g., tag 503) indicating that survey device 200 is configured to participate in an automatic configuration process with survey device controller 300. The Bluetooth® specification permits configuring a reply during the discovery process. The tag 503 can further convey information such as the model number, or serial number, or survey device 200, as well as information about the software operating on survey device 200.

In one embodiment, upon receiving the reply 502 from survey device 200, survey device controller 300 searches for replies (e.g., 502) which contain the tag 503 which identifies survey device 200 as being configured to initiate the automatic configuration process. In one embodiment, survey device controller 300 discards or ignores a reply sent from a Bluetooth® device which does not include tag 503. During a Bluetooth® discovery process, any Bluetooth® device within range of survey device controller 503 may generate a reply in response to scan command 501. This may include replies from, for example, cellular telephones, PDAs, or other Bluetooth® equipped devices with which a user of survey device controller 300 does not want to establish communications. Thus, by ignoring or discarding replies from devices which do not include tag 503, the number of devices from which to choose is reduced.

In one embodiment, button 211 of survey device 200 is then pressed. In one embodiment, the pressing of button 211 is an indication to communicatively couple survey device 200 with survey device controller 300. In response to an indication that button 211 is being pressed, survey device 200 generates message 505 which conveys to survey device controller 300 that button 211 is being pressed. In one embodiment, message 505 uniquely identifies survey device 200 as the device with which survey device controller 300 is to be communicatively coupled. It is noted that message 505 can convey some, or all, of the information conveyed in reply 502 as well. However, the information that button 211 is being pressed is in addition to the information normally conveyed during a typical Bluetooth® discovery process. In one embodiment, survey device 200 will not generate reply 502 unless button 211 is being pressed. In one embodiment, once button 211 has been pressed, reply 502 and message 505 will be automatically generated by survey device 200. In another embodiment, the user keeps button 211 pressed until a confirmation is generated by survey device controller 300 that wireless communication connection 104 has been established.

In one embodiment, survey device controller 300 automatically initiates establishing and configuring a wireless communication connection 104 in response to receiving message 505. In other words, survey device controller 300 will not initiate communicatively coupling with a device unless it receives a message 505 indicating that button 211 is being pressed. Wireless communication connection 104 is a Bluetooth® connection comprising survey device 200 and survey device controller 300. In other words, in response to message 505, survey device controller automatically initiates a Bluetooth® pairing with survey device 200. In one embodiment, survey device controller 300 is configured to initiate the Bluetooth® pairing when the reception of message 505 occurs contemporaneous with the indication that button 312 has been pressed. In other words, the reception of message 505 indicating that button 211 is being depressed occurs simultaneous with, or within a pre-determined time interval of, the indication that button 312 has been pressed. In another embodiment, survey device controller 300 requires that the reception of message 505 indicating the pressing of button 211 occurs simultaneous with the reception of an indication that button 312 is being pressed.

If there is a plurality of survey devices 200 being configured at essentially the same time, it is possible for survey device controller 300 to receive a message 505 from more than one survey device 200. If this occurs, survey device controller 300 is configured to suspend creating and configuring wireless communication connection 104 in one embodiment. Survey device controller 300 may generate a message or signal indicting that creating wireless communication connection 104 has failed and that another attempt should be initiated.

Thus, one embodiment simplifies the creation of a wireless communication connection between a survey device and a survey device controller. Because survey device controller 300 is configured to ignore a Bluetooth® reply from any device which does not include tag 503, embodiments facilitate identifying which devices are candidates to communicatively couple with survey device controller 300. Furthermore, because survey device controller 300 is configured to communicatively couple with survey devices only if they send a message (e.g., 505) which indicates that button 211 is being pressed. This facilitates identifying exactly which survey device (e.g., 200) with which it is intended to communicatively couple survey device controller 300. Furthermore, this process is performed in a substantially transparent manner with regard to the user of survey device 200 and survey device controller 300. As a result, the user of survey device 200 and survey device controller 300 is not required to navigate a plurality of displayed screens in order to select a device with which to couple and to configure the connection.

The following description is an example of the operations performed by a user in accordance with one embodiment. First, button 312 of survey device controller 300 is pressed. In response, processor 302 acts upon the indication that button 312 is being pressed and initiates automatically generating scan command 501. Button 211 on survey device 200 is also pressed. In response to receiving scan command 501, survey device 200 automatically generates reply 502 which comprises tag 503. Again, this identifies to survey device controller 300 which devices are candidates with which to create wireless communication connection 104. Survey device 200 also automatically generates message 505 which conveys to survey device controller 300 that button 211 is being pressed. In response to the indication that button 312 has been pressed and to message 505, survey device controller 300 automatically initiates creating and configuring wireless communication connection 104. Again, this is performed without intervention or participation by the user of survey device 200 and survey device controller 300. In one embodiment, survey device controller 300 generates a signal or message indicating when wireless communication connection 104 has been established between survey device 200 and survey device controller 300. Furthermore, the methods in accordance with various embodiments more intuitive for users who are not familiar with configuring communications between survey device 200 and survey device controller 300.

Figure 5B:
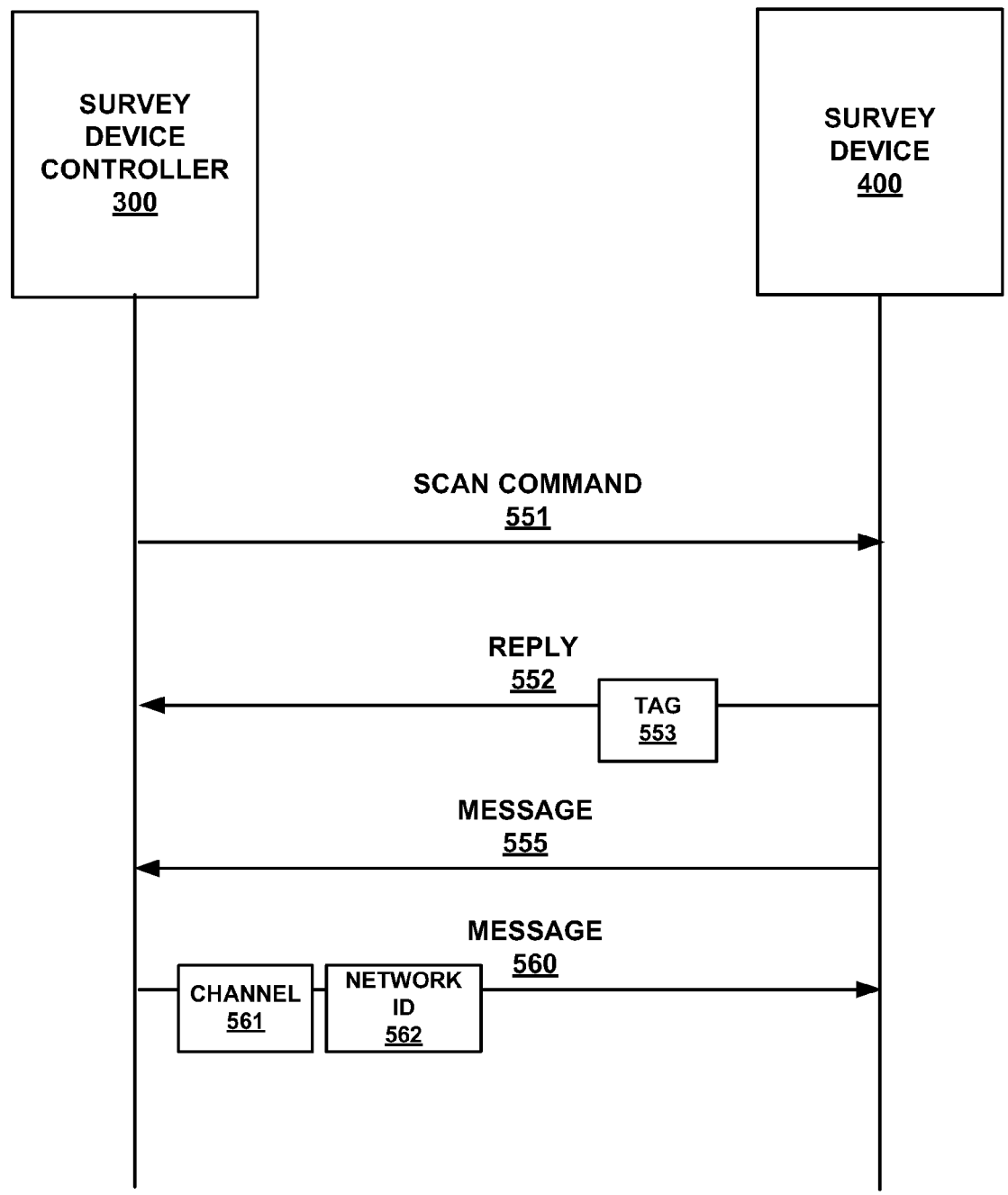

FIG. 5B shows a sequence of communications exchanged between survey device controller 300 and survey device 400 in accordance with one embodiment. In the present example, a user presses button 312 of survey device controller 300 and button 450 of survey device 400 concurrently or simultaneously. In one embodiment, survey device controller 300 then generates a scan command 551. Scan command 551 is configured to cause survey device 400 to automatically generate a reply 552 comprising tag 553. As described above with reference to tag 503 of FIG. 5A, tag 553 indicates that survey device 400 is configured to participate in an automatic configuration process. In one embodiment, survey device controller is configured to ignore a reply from a device which does not comprise tag 553. While button 450 of survey device 300 is being pressed, survey device 400 also generates message 555 which indicates that button 450 is being pressed. As described above, survey device controller 300 will not initiate creating a wireless communication connection using wireless transceiver 312 unless an indication is received from the survey device that button 450 is being pressed.

In one embodiment, scan command 551, reply 552, and message 555 are sent via wireless communication connection 104. In other words, a Bluetooth® connection has already been established between survey device controller 300 and survey device 400. Thus, the scan command 551, reply 552, and message 555 described with reference to FIG. 5B, may correspond to scan command 501, reply 502, and message 505 exchanged in the establishment of wireless communication connection 104.

In another embodiment, scan command 551, reply 552, and message 555 are exchanged via wireless connection 105. As described above, survey device controller 300 and survey device 400 are capable of communicating via a wireless network compliant with the IEEE 802.11 specifications for wireless networks, or via a 2.4 GHz frequency hopping radio transceiver. In one embodiment, the frequency hopping radio transceivers utilizes a plurality of channels 0-50 and a plurality of network identification numbers 0-250. The network identification is used to allow devices on the same channel to determine whether to process received data or ignore it. Thus, several networks may be established on the same channel without interfering with each other. Typically, channel 0 is not used for an established connection between two devices. Similarly, network ID number 0 is not used to identify a connection between two devices. Instead, a default setting of channel 1, network ID 1 is configured for wireless transceivers 311 and 440 in one embodiment. In one embodiment, when button 312 of survey device controller 300 is pressed, wireless transceiver 311 is automatically configured to send and receive messages via channel 0, network ID 0. Thus, survey device controller 300 automatically transmits scan command 551 via channel 0, network ID 0. Similarly, when button 450 of survey device 400 is pressed, wireless transceiver 440 is automatically configured to send and receive messages via channel 0, network ID 0. Thus, reply 552 is also sent via channel 0, network ID 0.

When survey device controller 300 receives message 555, it automatically selects a channel which is randomly selected from channels 2-50. Furthermore, survey device controller 300 automatically selects a network ID which is randomly selected from network IDs 2-250. In so doing, survey device controller 300 avoids selecting the default channel 1 and default network ID 1 for creating a communication connection with survey device 400. Survey device controller 300 then automatically generates message 560, comprising channel information 561, and network ID 562. After generating message 560, survey device controller 300 automatically switches to the channel and network ID (e.g., 561 and 562 respectively) which have been randomly selected. Additionally, in response to receiving message 560, survey device 400 also automatically switches to the channel and network ID (e.g., 561 and 562 respectively) which have been randomly selected by survey device controller 300. As an example, if survey device controller 300 randomly selects channel 20 and network ID 20, message 560 will convey channel 20 (e.g., 561) and network ID 20 (e.g., 562) to survey device 400. Survey device controller 300 will then automatically switch to channel 20 and network ID 20. Upon receiving message 560, survey device 400 also automatically switches to channel 20 and network ID 20. It is again noted that scan command 551, reply 552, and message 560 can be sent via a Bluetooth® connection (e.g., wireless communication connection 104), or via wireless communication connection 105 which utilizes wireless transceivers 311 and 440 of survey device controller 300 and survey device 400 respectively.

The following discussion describes an example of configuring wireless communication between survey device controller 300 and survey device 400 in accordance with one embodiment. In one embodiment, button 312 of survey device controller 300 and button 405 of survey device 400 are pressed. As a result of the indication that button 312 has been pressed, survey device controller 300 initiates configuration of a Bluetooth® wireless connection as described above with reference to FIG. 5A. In other words, scan command 501, reply 502, and message 505 are exchanged between survey device controller 300 and survey device 400. As a result, survey device controller 300 initiates the creation and configuration of wireless communication connection 104 which is a Bluetooth® communication connection. Survey device controller 300 then automatically selects a channel which is randomly selected from channels 2-50 and automatically selects a network ID which is randomly selected from network IDs 2-250. The selected channel and network ID are then conveyed to survey device 400 via wireless communication connection 104 in message 560. Survey device controller 300 and survey device 400 then automatically configure wireless transceiver 311 and wireless transceiver 440 respectively to communicate using the channel and network ID selected by survey device controller 300. In so doing, wireless communication connection 105 is automatically created using wireless transceiver 311 and wireless transceiver 440. In one embodiment, wireless communication connection 104 can be dropped by survey device controller 300 and survey device 400 once wireless communication connection 105 has been created. In another embodiment, wireless communication connection 104 is maintained after wireless communication connection 105 is created. In one embodiment, survey device controller then generates a message or signal indicating that wireless communication connection 105 has been established so that buttons 312 and 450 can be released.

In another embodiment, a wireless communication connection 104 is not established between survey device controller 300 and survey device 400. Thus, button 312 of survey device controller 300 and button 405 of survey device 400 are pressed. As a result of the indication that button 312 has been pressed, survey device controller 300 initiates configuration of wireless communication connection 105 as described above with reference to FIG. 5B. Thus, scan command 551, reply 552, and message 555 are automatically exchanged between wireless transceiver 311 and wireless transceiver 440 using channel 0 and network ID 0 of wireless communication connection 105. Survey device controller 300 then automatically selects a channel which is randomly selected from channels 2-50 and automatically selects a network ID which is randomly selected from network IDs 2-250. The selected channel and network ID are then conveyed to survey device 400 in message 560. Survey device controller 300 and survey device 400 then automatically configure wireless transceiver 311 and wireless transceiver 440 respectively to communicate using the channel and network ID selected by survey device controller 300. In so doing, wireless communication connection 105 is automatically created using wireless transceiver 311 and wireless transceiver 440. In this instance, establishing a Bluetooth® link between survey device controller 300 and survey device 400 is not performed prior to establishing wireless communication connection 105. In one embodiment, survey device controller then generates a message or signal indicating that wireless communication connection 105 has been established so that buttons 312 and 450 can be released.

In one embodiment, a plurality of devices can be communicatively coupled sequentially to create a wireless communication network. For example, survey device controller 300 can be communicatively coupled with survey device 200, or survey device 400 and then communicatively coupled with another device such as a GIS sensor (not shown) in a communication network.

In one embodiment, survey device controller 300 can couple with a plurality of devices in a Bluetooth® communication network. In another embodiment, in response to an indication that button 312 of survey device controller 300 has been pressed after wireless communication connection 105 has been established, survey device controller 300 will initiate the process described above with reference to FIG. 5B. Thus, survey device controller 300 will automatically switch to channel 0 and generate scan command 551 to the third device (e.g., 110 of FIG. 1). In response to a reply 552, conveying tag 553, and message 555 which indicates a selection event at the device 110. However, instead of randomly selecting a channel and network ID, survey device controller 300 selects the same channel as was previously conveyed to survey device 400 and a new network ID for the device 110. For example, as was described above, survey device controller 300 may select channel 20 and a network ID 20 for survey device 400. In one embodiment, when survey device controller 300 is establishing a wireless communication connection with a device 110, it will convey channel 20 (e.g., channel 561 of FIG. 5B) and a new network ID (e.g., 562 of FIG. 5B) for the device 110. For example, the third device may be assigned a network ID of 25. Thus, in one embodiment, a plurality of device may be communicatively coupled with survey device controller 300 sequentially to create a wireless communication network. It is again noted that survey device controller 300 and survey device 400 are used as examples of devices which can be communicatively coupled in one embodiment.

In another embodiment, survey device controller 300 and survey device 400 can be configured with wireless network devices which permit communicating via a WiFi connection. Thus, in one embodiment, wireless communication connection 105 comprises a WiFi connection. For example, in one embodiment survey device controller 300 and survey device 400 can be configured to create a peer-to-peer, or ad-hoc, WiFi network. In response to the pressing of button 312 of survey device controller 300 and button 450 of survey device 400, each respective device will listen for available WiFi networks with which it can be communicatively coupled. A list of the available networks is then displayed to allow a user to select the network with which it is desired to connect. For example, survey device 400 can be configured with a service set identification (SSID) of "survey device 400." In the present example, the SSID also comprises a tag similar to tag 503 of FIG. 5A or tag 553 of FIG. 5B which indicates that survey device 400 is configured to participate in an automatic configuration process with survey device controller 300.

In one embodiment, survey device controller 300 can be configured to only display the names of "server" devices which it has discovered which also comprise a tag indicating that the server device is configured to participate in an automatic configuration process with survey device controller 300. Thus, while button 450 of survey device 400 is being pressed, it can be discovered by survey device controller 300. Thus, survey device controller 300 will display "Survey device 400" as the available network that survey device controller 300 can be coupled. However, other WiFi equipped devices in the area which do not include the tag in the SSID will not be displayed on survey device controller 300. In the present example, survey device controller 300 will then automatically initiate establishing a WiFi peer-to-peer connection with survey device 400. If there is a plurality of survey devices 400 being configured at essentially the same time, it is possible for survey device controller 300 to detect more than one survey device controller device 400. If this occurs, survey device controller 300 is configured to suspend creating and configuring wireless communication connection 105 in one embodiment. Survey device controller 300 may generate a message or signal indicting that creating wireless communication connection 105 has failed and that another attempt should be initiated. It is noted that the role of server device can be performed by either of survey device controller 300 or survey device 400.

In another embodiment, survey device controller 300 can be configured to serve as a wireless router in a WiFi network. Thus, survey device controller 300 and survey device 400 can be configured to operate in an infrastructure mode for WiFi networks. Survey device controller 300 can assign IP addresses for a plurality of devices with which it is communicatively coupled via wireless communication connection 105. Additionally, survey device controller 300 can establish a wireless Internet connection via wireless communication connection 106 which facilitates wireless Internet connection for the devices (e.g., survey device 400, or another device) coupled with survey device controller 300.

Figure 5C:
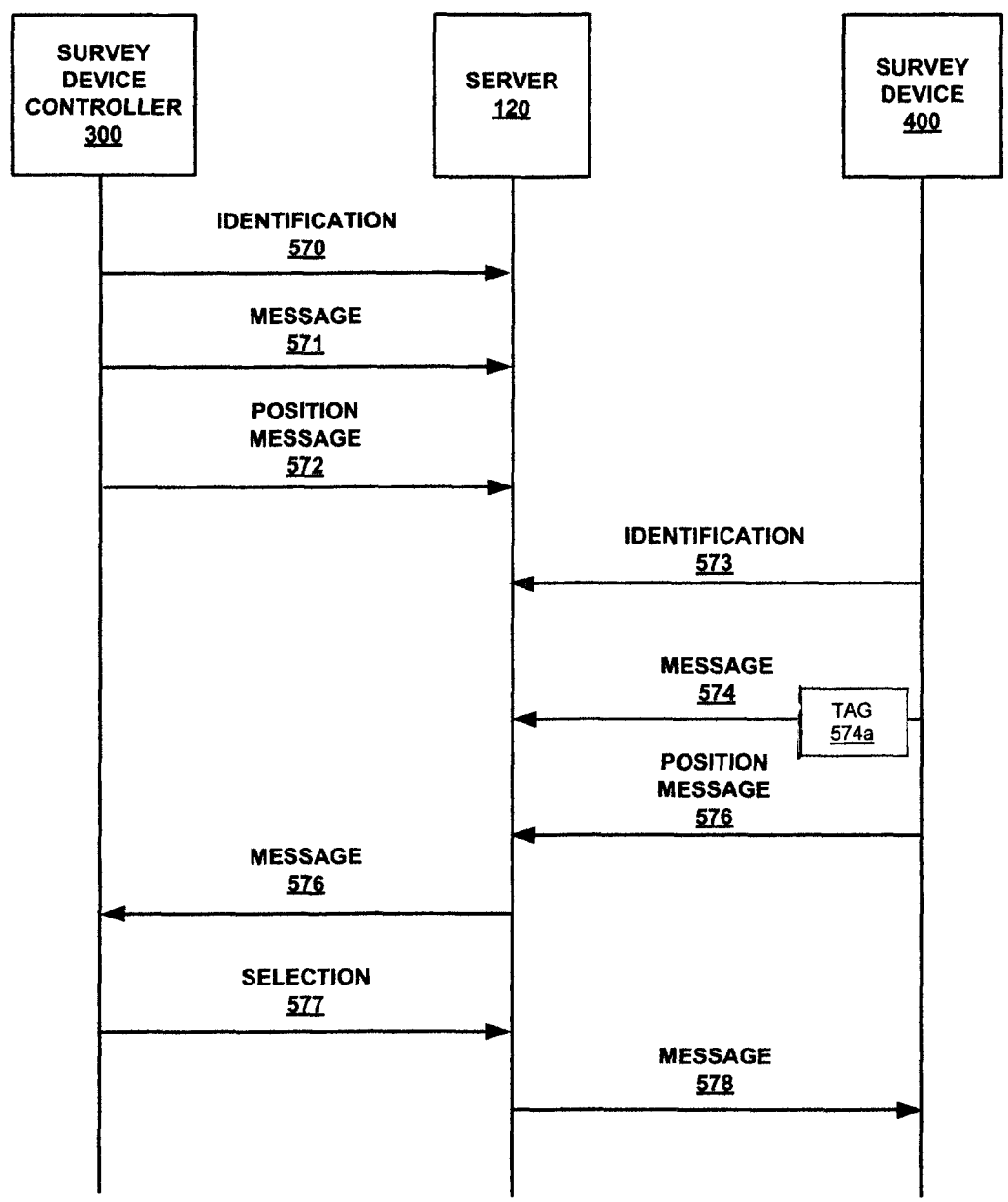

FIG. 5C shows a sequence of communications exchanged between survey device controller 300 and survey device 400 in accordance with one embodiment. In the present example, button 312 of survey device controller 300 and button 450 of survey device 400 are pressed concurrently or nearly simultaneously. In one embodiment, survey device controller 300 then automatically connects with the Internet using wireless transceiver 311 to communicatively couple with wireless communication connection 106. In the present example, survey device controller 300 communicates with server 120 and sends an identification message 570 to server 120. In one embodiment, survey device controller 300 logs an Internet Protocol (IP) address (e.g., a public IP address) with server 120. However, embodiments of survey device controller 300 may use some other method for identifying themselves.

In the present example, in response to button 312 being pressed, survey device controller 300 also conveys to server 120 that it is configured to participate in an automatic configuration process in message 571. In another embodiment, by logging into server 120, it will be assumed that survey device controller 300 is configured to participate in an automatic configuration process. Thus, in one embodiment, sending message 571 by survey device controller 300 is optional. In the present example, survey device controller 300 also conveys its current geographic position to server 120 in position message 572. For example, as discussed above, in one embodiment survey device controller 300 can be communicatively coupled with a satellite navigation receiver (e.g., 313 of FIG. 3) via input/output signal unit 309. Using data from the satellite navigation receiver, survey device controller 300 can convey its present geographic position to server 120 in position message 572. Again, it is noted that the data conveyed in messages 570, 571, and 572 can be conveyed in one or more messages in various embodiments.

In the present example, a user presses button 450 of survey device 400 (or button 211 of survey device 200) to initiate an automatic configuration process. In the present example, survey device 400 then automatically connects with the Internet via a cellular communication device. In the present example, either of survey devices 200 and 400 can either be configured with an internal cellular communication device (e.g., 210 or 440 respectively), or can be communicatively coupled with an external cellular telephone via an input/output signal unit (e.g., 202 or 402 respectively). The survey device then and sends an identification message 573 to server 120. In the present example, survey device 400 logs an Internet Protocol (IP) address with server 120 in message 573. However, embodiments of survey devices 200 or 400 may use some other method for identifying themselves.

In the present example, in response to button 450 being pressed, survey device 400 also conveys to server 120 that it is configured to participate in an automatic configuration process in message 574. In the present example, message 574 also comprises a tag 574a which indicates that survey device 400 is configured to participate in an automatic configuration process. In another embodiment, by logging into server 120, it will be assumed that survey device 450 is configured to participate in an automatic configuration process. In the present example, survey device 400 also conveys its current geographic position to server 120 in position message 575. For example, as discussed above, in one embodiment survey device 400 comprises a GPS receiver 280 for receiving satellite navigation signals and deriving a geographic position. Similarly, survey device 200 also comprises a GPS receiver 280 for receiving satellite navigation signals and deriving a geographic position. Using data from the GPS receiver 280, survey device 400 can convey its present geographic position to server 120. Again, it is noted that the data conveyed in messages 573, 574, and 575 can be conveyed in one or more messages in various embodiments.

In the present example, server 120 is configured to compare the geographic positions of devices which report that they are configured to participate in the automatic configuration process. In one embodiment, server 120 creates a list of all devices (e.g., survey device 400) within a given radius of survey device controller 300. In another embodiment, server 120 determines a region where survey device controller 300 is located and another region(s) where other devices are located which can participate in an automatic configuration process with survey device controller 300. In the present example, upon determining at least one device which is located proximate to survey device controller 300 which has indicated that it is configured to participate in the automatic configuration process, server 120 sends a message 576 to survey device controller 300 which identifies the devices. In the present example, message 576 also comprises tag 574a which indicates to survey device controller 400 that survey device 400 is configured to participate in an automatic configuration process. In another embodiment, server 120 does not convey to survey device controller 300 the identity of devices which have not sent tag 574a. In the present example, server 120 does not convey to survey device controller 300 the identity of device 400 unless button 450 is being pressed. Thus, message 576 also indicates that a user of survey device 400 is currently pressing button 450. In the present example, the user of survey device controller 300 selects the device with which it is desired to establish communications and conveys that selection in message 577. Server 120 then sends a message 578 to survey device 400 which identifies survey device controller 300. In one embodiment, messages 576 and 578 also convey the HTTP data needed for each device to communicate with the other directly. For example, message 576 can convey the IP address of survey device 400 to survey device controller 300. Similarly, message 578 can convey the IP address of survey device controller 300 to survey device 400. It is noted that additional connection data may be exchanged between survey device controller 300 and/or survey device 400 as necessary. The additional connection data may be exchanged between survey device controller 300 and survey device 400 directly, or via server 120. In the present example, once a connection between survey device controller 300 and survey device 400 has been established, server 120 generates a signal indicating to indicate to the user(s) of survey device controller 300 and survey device 400 that the wireless communication connection has been established and that pressing of buttons 312 and 450 is no longer necessary.

In one embodiment, message 576 also includes information which facilitates directly establishing communications between survey device controller 300 and survey device 400. In response to receiving message 577, server 120 generates will terminate communications with survey device controller 300 and survey device 400. In the present example, survey device controller 300 then establishes direct communications with survey device 400 using the information received in message 576. Survey device controller 300 then communicates commands for controlling operation of survey device 200 using HTTP commands conveyed via wireless communication connection 106. In another embodiment, survey device controller 300 sends connection details which permit connecting via a Bluetooth device or radio as described above with reference to FIGS. 5A and 5B. In another embodiment, communication between survey device controller 300 and survey device 400 continues via server 120. It is again noted that a plurality of devices can be coupled with survey device controller 300. For example, a plurality of devices can be communicatively coupled with survey device controller 300 via server 120. Alternatively, a plurality of devices can be communicatively coupled with survey device controller 300 as described above with reference to FIGS. 5A and 5B.

Figure 6:
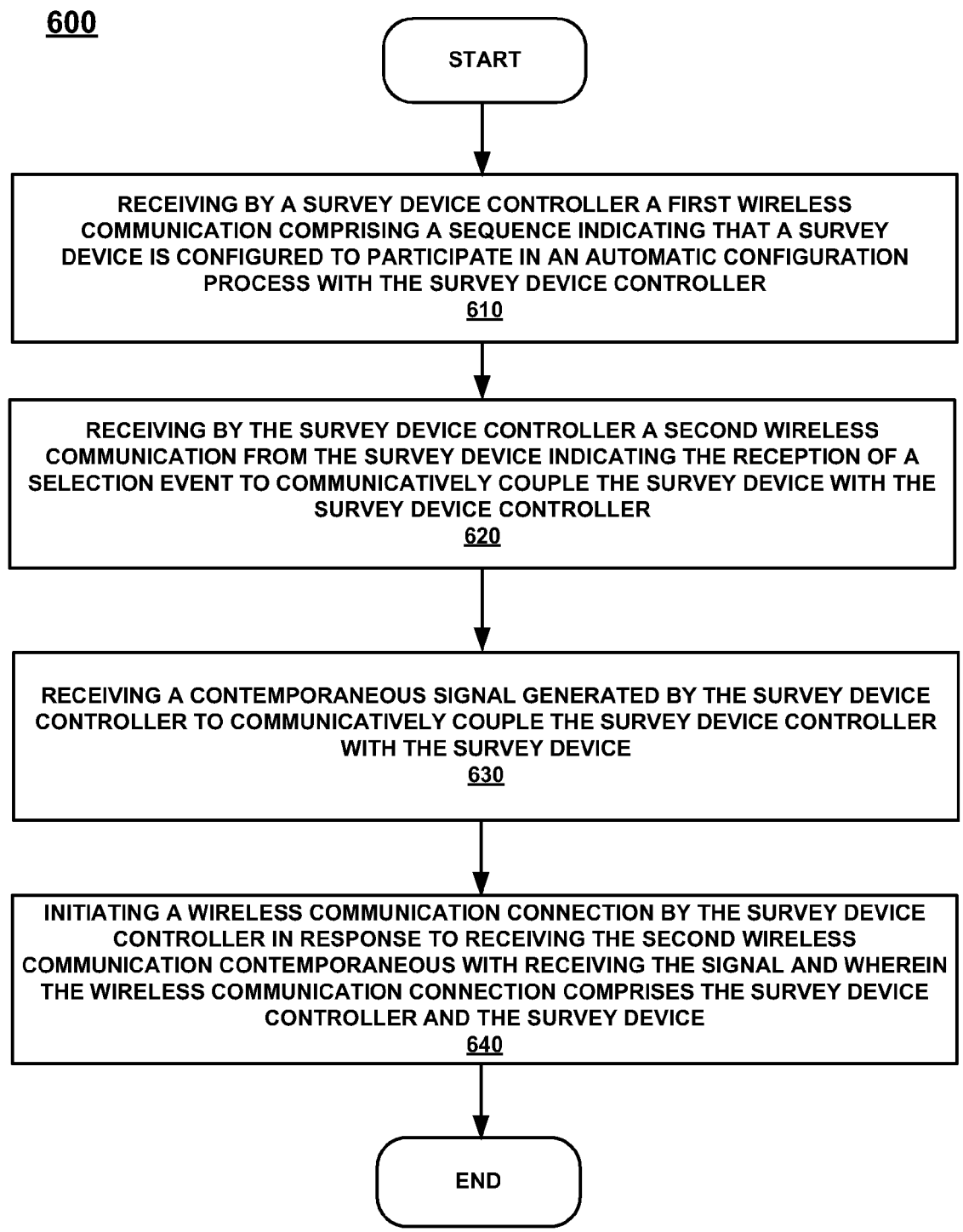
FIG. 6 is a flowchart of a method for communicatively coupling a survey device and a survey device controller in accordance with one embodiment.

FIG. 6 is a flowchart of a method 600 for configuring wireless communication of a survey device and a survey device controller in accordance one embodiment. In operation 610 of FIG. 1, receiving by a survey device controller a first wireless communication comprising a sequence indicating that a survey device is configured to participate in an automatic configuration process with the survey device controller is received by a survey device controller. As described above with reference to FIGS. 5A and 5B, survey device 200 and/or 400 generate reply 502 and/or 552. In one embodiment, reply 502 comprises a tag 503 which conveys to survey device controller 300 that survey device 200 or 400 is configured to participate in an automatic process for configuring wireless communication with survey device controller 300. In one embodiment, reply 552 comprises a tag 553 which conveys to survey device controller 300 that survey device 400 is configured to participate in an automatic process for configuring wireless communication with survey device controller 300.

In operation 620 of FIG. 6, a second wireless communication from the survey device indicating the reception of a selection event to communicatively couple the survey device with the survey device controller is received by the survey device controller. As described above with reference to FIGS. 5A and 5B, survey device 200 and/or 400, or device 110, also send message 505 and/or message 555 which indicates that a button is being pressed on the survey device. For example, message 505 conveys to survey device controller 300 that button 211 of survey device 200 is being pressed. In another embodiment, message 505 conveys to survey device controller 300 that button 450 of survey device 400 is being pressed. In another embodiment, message 555 conveys to survey device controller 300 that button 450 of survey device 400 is being pressed. As described above, survey device controller 300 uses this information to identify the particular survey device with which it is to be communicatively coupled via a wireless communication connection.

In operation 630 of FIG. 6, a signal which is generated by the survey device controller is received to communicatively couple the survey device controller with the survey device and wherein said receiving the signal is contemporaneous with the receiving said second wireless communication. As described above, survey device controller also receives an indication that button 312 of survey device controller 300 is being pressed concurrent with receiving the indication that button 211 of survey device 200 or button 450 of survey device 400 is being pressed. In one embodiment, the indication that button 312 of survey device controller 300 is being pressed is received simultaneous with receiving the indication that button 211 of survey device 200 or button 450 of survey device 400 is being pressed. In one embodiment, the indication that button 312 of survey device controller 300 is being pressed may be received within a pre-determined interval of the indication that button 211 of survey device 200 or button 450 of survey device 400 is being pressed.

In operation 640 of FIG. 6, initiating a wireless communication connection is initiated by the survey device controller in response to receiving the second wireless communication contemporaneous with receiving said signal and wherein said wireless communication connection comprises said survey device controller and said survey device. As described above, survey device controller 300 then creates and configures a wireless communication connection with the survey device which has been identified based upon the message received in operation 620 above. Receiving the indication that button 211 of survey device 200 or button 450 of survey device 400 is being pressed identifies the particular survey device with which it is desired to communicatively couple survey device controller 300.

Figure 7:
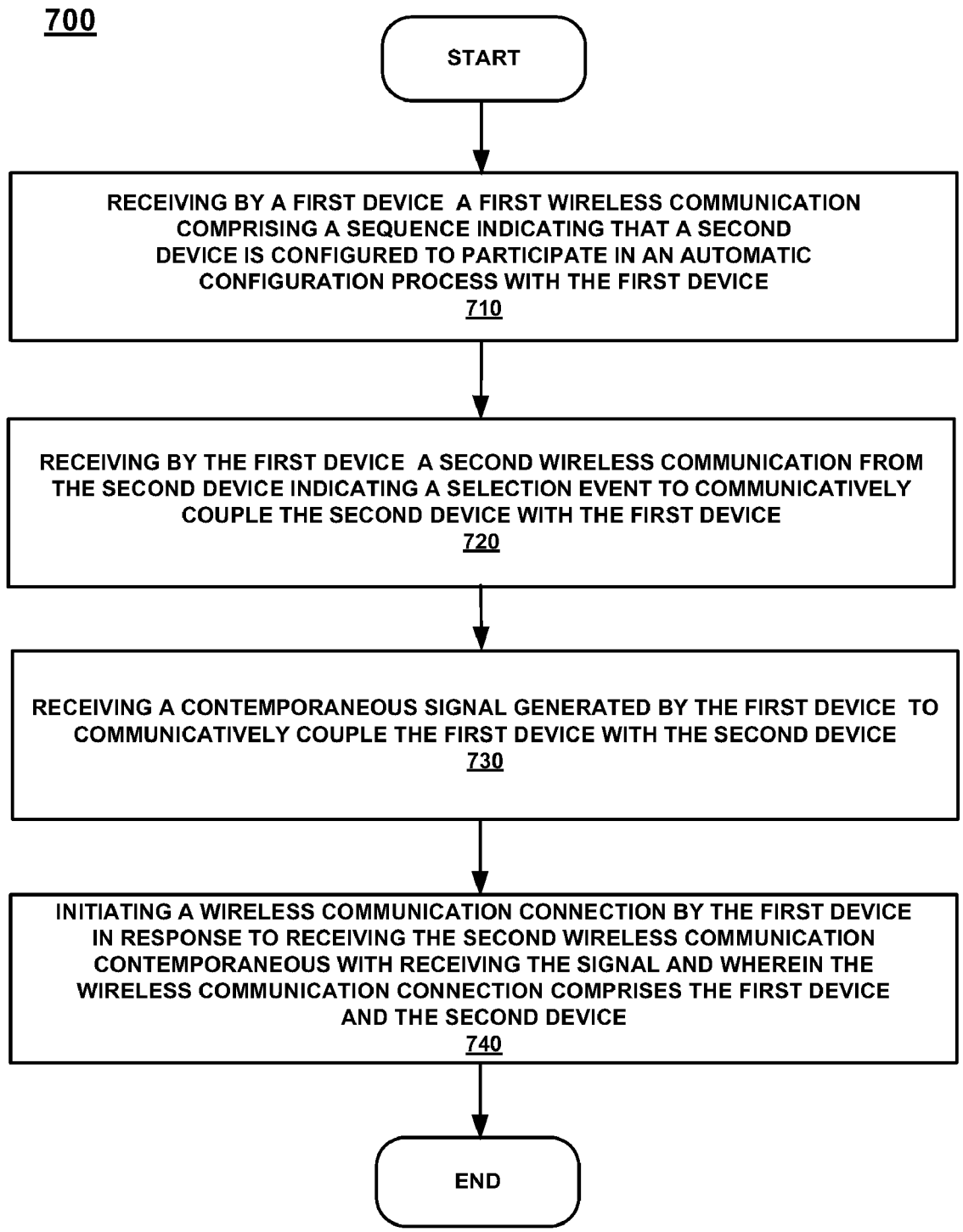
FIG. 7 is a flowchart of a method for configuring wireless communication in accordance with one embodiment.

FIG. 7 is a flowchart of a method 700 for configuring wireless communication in accordance with one embodiment. In operation 710, a first device receives a first wireless communication comprising a sequence indicating that a second device is configured to participate in an automatic configuration process with the first device. It is noted that embodiments are not limited to survey devices and survey device controllers alone. For example, embodiments may be implemented by a variety of devices such as, but not limited to, a camera, a laser tracking device, an optical total station, a robotic total station, a Geographic Information System (GIS) device such as a GIS sensor, a device controller or other devices which utilize wireless communications.

In operation 720 of FIG. 7, the first device receives a second wireless communication from the second device indicating a selection event to communicatively couple the second device with the first device. As described above with reference to FIGS. 5A and 5B, survey device 200, device 110, and/or survey device 400 also send message 505 and/or message 555 which indicates that a button is being pressed. For example, message 505 conveys to survey device controller 300 that button 211 of survey device 200, or of device 110, is being pressed. In another embodiment, message 505 conveys to survey device controller 300 that button 450 of survey device controller 400 is being pressed. As described above, survey device controller 300 uses this information to identify the particular survey device with which it is to be communicatively coupled via a wireless communication connection.

In operation 730 of FIG. 7, signal is received which is generated by the first device to communicatively couple the first device with the second device and wherein the receiving said signal is contemporaneous with the receiving the second wireless communication. As described above, survey device controller also receives an indication that button 312 of survey device controller 300 is being pressed concurrent with receiving the indication that button 211 of survey device 200 or button 450 of survey device 400 is being pressed. In one embodiment, the indication that button 312 of survey device controller 300 is being pressed is received simultaneous with receiving the indication that button 211 of survey device 200 or button 450 of survey device 400 is being pressed. In one embodiment, the indication that button 312 of survey device controller 300 is being pressed may be received within a pre-determined interval of the indication that button 211 of survey device 200 or button 450 of survey device 400 is being pressed.

In operation 740 of FIG. 7, a wireless communication connection is initiated by the first device in response to the receiving the second wireless communication contemporaneous with the receiving the signal. As described above, survey device controller 300 then creates and configures a wireless communication connection with the survey device which has been identified based upon the message received in operation 620 above. Receiving the indication that button 211 of survey device 200 or button 450 of survey device 400 is being pressed identifies the particular survey device with which it is desired to communicatively couple survey device controller 300.

Embodiments of the present technology are thus described. While the present technology has been described in particular embodiments, it should be appreciated that the present technology should not be construed as limited to these embodiments alone, but rather construed according to the following claims.

What is claimed is:

1. A system for configuring wireless communication of a survey device and a survey device controller, said system comprising:

a survey device controller configured to receive a first wireless communication comprising a sequence indicating that a survey device is configured to participate in an automatic configuration process with said survey device controller; and said survey device which is configured to generate a second wireless communication conveying that a first button disposed on said survey device indicating the reception of a selection event to communicatively couple said survey device with said survey device controller has been pressed and wherein said survey device controller is further configured to automatically initiate a wireless communication connection between said survey device controller and said survey device in response to receiving said second wireless communication contemporaneous with receiving a signal generated by said survey device controller which indicates that a second button disposed on said survey device controller has been pressed to communicatively couple said survey device controller with said survey device and wherein said survey device controller is further configured to automatically generate a third wireless communication to initiate discovery of said survey device in response to said signal and wherein said survey device is configured to automatically generate said first wireless communication in response to receiving said third wireless communication.

2. The system of claim 1 wherein said survey device controller is configured to generate a Bluetooth® discovery command as said third wireless communication.

3. The system of claim 2 wherein said survey device controller is configured to ignore a reply from a device when said reply does not comprise said sequence.

4. The system of claim 1 wherein said survey device controller is configured to suspend initiating said wireless communication connection in response to receiving a plurality of signals from a plurality of survey devices concurrent with receiving said signal.

5. The system of claim 1 wherein said survey device controller is configured to automatically monitor a radio channel pre-selected for configuring said wireless communication connection in response to receiving said signal.

6. The system of claim 5 wherein said survey device is configured to broadcast said second wireless communication on said radio channel pre-selected for configuring said wireless communication connection in response to receiving said signal.

7. The system of claim 6 wherein said survey device controller is configured to randomly select a second radio channel from a set of pre-selected radio channels and to randomly select a network identification from a pre-selected set of network identifications and to convey said second radio channel and said network identification to said survey device.

8. The system of claim 7 wherein said survey device and said survey device controller implement said wireless communication connection using said second radio channel and said network identification.

9. The system of claim 7 wherein said survey device controller and said survey device are configured to establish a second wireless communication connection comprising said survey device and said survey device controller using said second radio channel and said network identification and to terminate said wireless communication connection when said second wireless communication connection is established.

10. The system of claim 1 wherein said survey device controller is configured to generate a second signal indicating that establishing said wireless communication connection is in progress and to generate a third signal indicating that establishing said wireless communication connection has been completed.

11. The system of claim 1 wherein said first wireless communication and said second wireless communication are exchanged via a WiFi wireless communication connection.

12. The system of claim 1 wherein said first wireless communication and said second wireless communication are exchanged via a cellular wireless communication connection.

13. A method for configuring wireless communication of a survey device and a survey device controller, said method comprising:
receiving by a survey device controller a first wireless communication comprising a sequence indicating that a survey device is configured to participate in an automatic configuration process with said survey device controller;
receiving by said survey device controller a second wireless communication from said survey device indicating the reception of a selection event to communicatively couple said survey device with said survey device controller and wherein said selection event comprises an indication of a first button disposed on said survey device has been pressed;
receiving a signal which is generated by said survey device controller to communicatively couple said survey device controller with said survey device said signal comprising an indication of a second button disposed on said survey device controller has been pressed and wherein said receiving said signal is contemporaneous with said receiving said second wireless communication;
initiating a wireless communication connection by said survey device controller in response to said receiving said second wireless communication contemporaneous with said receiving said signal and wherein said wireless communication connection comprises said survey device controller and said survey device;
using said survey device controller to automatically generate a third wireless communication to initiate discovery of said survey device in response to said signal; and
automatically generating said first wireless communication by said survey device in response to receiving said third wireless communication.

14. The method as recited in claim 13 wherein said generating said third wireless communication further comprises:
generating a Bluetooth® discovery command by said survey device controller as said third wireless communication.

15. The method as recited in claim 14 further comprising:
said survey device controller ignoring a communication from a device when said communication does not comprise said sequence.

16. The method as recited in claim 13 further comprising:
suspending said initiating said wireless communication connection in response to said survey device controller receiving a plurality of signals from a plurality of survey devices concurrent with receiving said signal.

17. The method as recited in claim 13 further comprising:
automatically monitoring a radio channel pre-selected for configuring said wireless communication connection in response to said survey device controller receiving said signal.

18. The method as recited in claim 17 further comprising:
broadcasting said second wireless communication by said survey device on said radio channel pre-selected for configuring said wireless communication connection in response to receiving said signal.

19. The method as recited in claim 18 further comprising:
randomly selecting a second radio channel by said survey device controller from a set of pre-selected radio channels;
randomly selecting a network identification by said survey device controller from a pre-selected set of network identifications; and
conveying said second radio channel and said network identification to said survey device.

20. The method as recited in claim 19 further comprising:
using said second radio channel and said network identification to implement said wireless communication connection by said survey device and said survey device controller.

21. The method as recited in claim 19 further comprising:
establishing a second wireless communication connection comprising said survey device and said survey device controller using said second radio channel and said network identification; and
terminating said wireless communication connection when said second wireless connection is established.

22. The method as recited in claim 13 further comprising:
generating a second signal by said survey device controller indicating that establishing said wireless communication connection is in progress; and
generating a third signal by said survey device controller indicating that establishing said wireless communication connection has been completed.

23. The method as recited in claim 13 further comprising:
utilizing a WiFi wireless communication connection exchange said first wireless communication and said second wireless communication.

24. The method as recited in claim 13 further comprising:
utilizing a cellular wireless communication connection exchange said first wireless communication and said second wireless communication.

25. A method for configuring wireless communication, said method comprising:
receiving by a first device a first wireless communication comprising a sequence indicating that a second device is configured to participate in an automatic configuration process with said first device;
receiving by said second device an indication of a selection event wherein a first button disposed on said second device has been pressed;
receiving by said first device a second wireless communication from said second device indicating the reception of said selection event to communicatively couple said second device with said first device;
receiving a signal which is generated by said first device to communicatively couple said first device with said second device wherein receiving said signal comprises an indication of a second button disposed on said first device has been pressed and wherein said receiving said signal is contemporaneous with said receiving said second wireless communication;
initiating a wireless communication connection by said first device in response to said receiving said second wireless communication contemporaneous with said receiving said signal and wherein said wireless communication connection comprises said first device and said second device;
using said first device to automatically generate a third wireless communication to initiate discovery of said second device in response to said signal; and
automatically generating said first wireless communication by said second device in response to receiving said third wireless communication.

26. The method as recited in claim 25 wherein said generating said third wireless communication further comprises:
generating a Bluetooth® discovery command by said first device as said third wireless communication.

27. The method as recited in claim 26 further comprising:
said first device ignoring a communication from a device when said communication does not comprise said sequence.

28. The method as recited in claim 25 further comprising:
suspending said initiating said wireless communication connection in response to said first device receiving a plurality of signals from a plurality of second devices concurrent with receiving said signal.

29. The method as recited in claim 25 further comprising:
automatically monitoring a radio channel pre-selected for configuring said wireless communication connection in response to said first device receiving said signal.

30. The method as recited in claim 29 further comprising:
broadcasting said second wireless communication by said second device on said radio channel pre-selected for configuring said wireless communication connection in response to receiving said signal.

31. The method as recited in claim 30 further comprising:
randomly selecting a second radio channel by said first device from a set of pre-selected radio channels;
randomly selecting a network identification by said first device from a pre-selected set of network identifications; and
conveying said second radio channel and said network identification to said second device.

32. The method as recited in claim 31 further comprising:
using said second radio channel and said network identification to implement said wireless communication connection by said second device and said first device.

33. The method as recited in claim 31 further comprising:
establishing a second wireless communication connection comprising said second device and said first device using said second radio channel and said network identification; and
terminating said wireless communication connection when said second wireless connection is established.

34. The method as recited in claim 25 further comprising:
generating a second signal by said first device indicating that establishing said wireless communication connection is in progress; and
generating a third signal by said first device indicating that establishing said wireless communication connection has been completed.

35. The method as recited in claim 25 further comprising:
selecting said first device and said second device from the group consisting of: a camera, a laser tracking device, an optical total station, a robotic total station, a Geographic Information System (GIS) device, and a controller.

36. The method as recited in claim 25 further comprising:
receiving by said first device a third wireless communication comprising a sequence indicating that a third device is configured to participate in an automatic configuration process with said first device;
receiving by said first device a fourth wireless communication from said third device indicating the reception of a selection event to communicatively couple said third device with said first device;
receiving a signal which is generated by said first device to communicatively couple said first device with said third device and wherein said receiving said signal is contemporaneous with said receiving said fourth wireless communication; and
initiating a wireless communication connection by said first device in response to said receiving said fourth wireless communication contemporaneous with said receiving said signal and wherein said wireless communication connection comprises said first device and said third device.

37. The method as recited in claim 25 further comprising:
utilizing a WiFi wireless communication connection exchange said first wireless communication and said second wireless communication.

38. The method as recited in claim 25 further comprising:
utilizing a cellular wireless communication connection exchange said first wireless communication and said second wireless communication.

* * * * *